(12) United States Patent
Viovy et al.

(10) Patent No.: US 9,744,513 B2
(45) Date of Patent: Aug. 29, 2017

(54) ENCAPSULATION MICROFLUIDIC DEVICE

(75) Inventors: Jean-Louis Viovy, Paris (FR); Max Chabert, Chambery (FR)

(73) Assignee: Jean-Louis Viovy, Paris (FR)

( * ) Notice: Subject to any disclaimer, the term of this patent is extended or adjusted under 35 U.S.C. 154(b) by 1353 days.

(21) Appl. No.: 13/120,310

(22) PCT Filed: Sep. 22, 2008

(86) PCT No.: PCT/IB2008/053842
§ 371 (c)(1),
(2), (4) Date: Aug. 4, 2011

(87) PCT Pub. No.: WO2009/037680
PCT Pub. Date: Mar. 26, 2009

(65) Prior Publication Data
US 2011/0285042 A1    Nov. 24, 2011

Related U.S. Application Data

(60) Provisional application No. 60/960,217, filed on Sep. 20, 2007.

(51) Int. Cl.
*B01J 13/02* (2006.01)
*B01J 13/04* (2006.01)

(52) U.S. Cl.
CPC ..................... *B01J 13/04* (2013.01)

(58) Field of Classification Search
USPC ........ 428/402–402.24, 403, 404, 407, 321.1, 428/474.4; 427/331, 389.9, 212,
(Continued)

(56) References Cited

U.S. PATENT DOCUMENTS

| 6,558,665 B1 | 5/2003 | Cohen et al. |
| 2002/0106670 A1 | 8/2002 | Herrmann et al. |

(Continued)

FOREIGN PATENT DOCUMENTS

| EP | 1 637 226 A1 | 3/2006 |
| WO | WO 2004/002627 A2 | 1/2004 |

(Continued)

OTHER PUBLICATIONS

Zhang Xl et al., "Continuous flow separation of particles within an asymmetric microfluidic device" Apr. 2006;6(4):561-6. Epub Mar. 13, 2006.*

(Continued)

*Primary Examiner* — Jeffrey Washville
(74) *Attorney, Agent, or Firm* — Oliff PLC

(57) ABSTRACT

A method for encapsulating or sorting colloidal objects, comprising the step of flowing said objects in a first flow stream partly or fully surrounded by at least one second flow stream in a channel comprising a narrow strait, wherein along an elongated part of the path of said first flow stream either (a) the bidimensional size of said first flow stream is smaller than the largest bidimensional size of at least some of said objects, either (b) the smallest unidimensional size of said first flow stream is smaller than the largest unidimensional size of at least some of said objects, either (c) said first flow stream is splitting, in the absence of said objects, into droplets with a volume smaller than the volume of at least some of said objects, or (d) said first flow stream would have in the absence of said particles, a shape that cannot entirely encompass some of said objects.

20 Claims, 5 Drawing Sheets

(58) Field of Classification Search
USPC ........ 427/213–213.36, 483, 256; 264/534, 5, 264/41, 4–4.7; 424/400, 408, 450, 451, 424/455, 93.7, 184.1, 497, 489, 501, 490, 424/491, 492, 493, 494, 495
See application file for complete search history.

(56) References Cited

U.S. PATENT DOCUMENTS

| | | | |
|---|---|---|---|
| 2004/0072278 A1* | 4/2004 | Chou | B01L 3/502761 435/29 |
| 2004/0266022 A1 | 12/2004 | Sundararajan et al. | |
| 2005/0221339 A1* | 10/2005 | Griffiths et al. | 435/6 |
| 2006/0051329 A1* | 3/2006 | Lee | B01F 3/0807 424/93.7 |
| 2006/0163385 A1 | 7/2006 | Link et al. | |
| 2006/0228721 A1 | 10/2006 | Leamon et al. | |
| 2007/0054119 A1 | 3/2007 | Garstecki et al. | |
| 2009/0214655 A1 | 8/2009 | Ganan Calvo et al. | |
| 2009/0215154 A1 | 8/2009 | Ganan Calvo et al. | |

FOREIGN PATENT DOCUMENTS

| | | |
|---|---|---|
| WO | WO 2006/040551 A2 | 4/2006 |
| WO | WO 2006/082263 A1 | 8/2006 |
| WO | WO 2006/117422 A2 | 11/2006 |
| WO | WO 2007/133710 A2 | 11/2007 |

OTHER PUBLICATIONS

Sakai et al., "Usefulness of Flow Focusing Technology for Producing Subsieve-Size Cell Enclosing Capsules: Application for Agarose Capsules Production." *Biochemical Engineering Journal*, 2006, vol. 30, pp. 218-221.

Tan et al., "Controlled Microfluidic Encapsulation of Cells, Proteins, and Microbeads in Lipid Vesicles." *J. Am. Chem. Soc.*, 2006, vol. 128, pp. 5656-5658.

Wang et al., "Microfluidic Sorting of Mammalian Cells by Optical Force Switching." *Nature Biotechnology*, 2005, vol. 23, No. 1, pp. 83-87.

International Search Report issued in International Application No. PCT/IB2008/053842 dated Sep. 22, 2009.

Written Opinion of International Searching Authority issued in International Application No. PCT/IB2008/053842 dated Sep. 22, 2009.

* cited by examiner

ENCAPSULATION MICROFLUIDIC DEVICE

This is a national stage of Application No. PCT/IB2008/053842 filed Sep. 22, 2008, which claims the benefit of U.S. Provisional Application No. 60/960,217 filed Sep. 20, 2007. The disclosure of the prior applications is hereby incorporated by reference herein in its entirety.

BACKGROUND OF THE INVENTION

The post-genome era is stimulating a strong demand for high-throughput assays uncovering the individual behavior of single cells in populations. The pharmaceutical industry also requires high-throughput cell-based drug screening assays, to reduce the cost and ethical issues of animal testing, better assess effects and toxicity on human cells, and minimize human and economical risks of clinical trials. Powerful single cell screening methods are also highly wanted in oncology, due to the genetic variability of tumor cells. The same type of demand also concerns viruses, for which high throughput screening is a strong need. Viruses mutate very fast, and their pathogenic power is directly dependent on this rate of mutations. It is thus of paramount importance to be able to study and anticipate virus evolution and mutation, e.g. to anticipate and prepare adequate responses to the risk of pandemics.

In material sciences, too, there is a high demand for methods able to encapsulate colloidal objects such as latex particles, metal particles, magnetic material, or various dielectric materials in well-controlled envelopes of another material, and to sort different colloidal objects. For instance U.S. Pat. No. 6,558,665 to Mrksich discloses a method for encapsulating particles, involving two immiscible liquids of different densities provided in a container as upper and lower liquids, and sucking liquid from said container through a tube making a sprout of the lower, high density liquid in the stream of upper, low density liquid. This method, however, imposes that the material to encapsulate the particles be less viscous and denser than the driving liquid. It also requires large volume of liquids, and it is thus not well adapted to the manipulation of rare or expensive products. Finally, to change the thickness of the surrounding layer, i.e. the size of the final particles, it is necessary to change the viscosity of the upper fluid, which makes the device unpractical for many applications.

Microfabricated and micro fluidic devices raise the hope of a dramatic breakthrough for the preparation, manipulation and sorting of microscopic and nanoscopic objects. For instance, WO 2004/002627 to Anna et al., US patent application 20050221339 to Griffiths et al, or WO 2006/040551 to Griffiths, disclose different ways for compartmentalizing a fluid containing species into microdroplets carried in an immiscible fluid, and performing different screening regarding these species inside said microdroplets, using microfluidic control.

Microfluidics is particularly interesting for cell assays, as reviewed e.g. in El-Ali, J., Sorger, P. K. & Jensen, K. F. Cells on chips. *Nature* 442, 403-411 (2006), incorporated herein by reference. Encapsulated cells can be precisely manipulated using optical traps, as disclosed e.g. in He, M. et al. *Anal. Chem.* 77, 1539-1544 (2005), incorporated herein by reference, but this requires complex and slow technologies. In contrast, cell encapsulation in drops using flow focusing geometries offer potential for very high throughput. So far, however, attempts in this direction, as disclosed e.g. in Tan, Y.-C., Hettiarachchi, K., Siu, M., Pan, Y.-R. & Lee, A. P. *J. Am. Chem. Soc.* 128, 5656-5658 (2006), or in US patent application 20060163385 to Link rely on a high dilution of cells in order to avoid the encapsulation of several cells in the same drop, and require a delicate and complex sorting of "positive" droplets by flow-cytometry technologies.

SUMMARY OF THE INVENTION

It is thus a purpose of the invention, to propose devices and methods allowing the encapsulation and sorting of colloidal objects such as colloidal aggregates, molecules, cells, viruses, cell assemblies, organelles, macromolecules or particles, in suspension in a fluid, this new method not suffering from the disadvantages of prior art ones.

The present invention generally relates to systems and methods for the encapsulation and for the sorting of colloidal objects, and to articles produced by such systems and methods. It also relates to the use of such systems, methods or articles, in processes for the production, design or analysis of subsequent articles or products. The subject matter of this application involves, in some cases, interrelated products, alternative solutions to a particular problem, and/or a plurality of different uses of a single system or article.

In one of its aspects, the invention relates to a method for creating a dispersion of a first fluid containing at least a first type of colloidal objects, into individual compartments suspended in a second fluid, wherein more than 50%, and preferably more than 70% of said compartments contain one and only one of said colloidal objects wherein said objective is reached without involving an active sorting of said compartments.

In another of its aspects, the invention relates to a microfluidic device comprising a first zone, in which a first fluid containing colloidal objects is split into a multiplicity of compartments with different volumes suspended in a second fluid, and a second zone in which said compartments are self-sorted by passive hydrodynamic means. In some aspects of the invention, this self-sorting is a sorting by size. In some further aspects, the size of said compartments is correlated with at least the size, or at least the number, of colloidal objects contained in said compartments.

In another of its aspects, the invention relates to a method for encapsulating objects. In another of its aspects, it relates to a method for sorting objects. In yet another privileged aspect, it relates to a method for encapsulating and sorting objects in a single operation in a microfluidic channels network.

More specifically, in one of its aspects, the invention involves a method for encapsulating or sorting colloidal objects, comprising the step of flowing said objects in a first flow stream partly or fully surrounded by a second flow stream in a microchannel, wherein said first flow stream splits, in the absence of said objects, into droplets with a volume smaller than the volume of said objects.

In another aspect, the invention relates to a method for encapsulating or sorting colloidal objects, comprising the step of flowing said objects in a first flow stream partly or fully surrounded by at least one second flow stream in a channel comprising a narrow strait, wherein along an elongated part of the path of said first flow stream either (a) the bidimensional size of said first flow stream is smaller than the largest bidimensional size of at least some of said objects, either (b) the smallest unidimensional size of said first flow stream is smaller than the largest unidimensional size of at least some of said objects, either (c) said first flow stream is splitting, in the absence of said objects, into droplets with a volume smaller than the volume of at least some of said objects, or (d) said first flow stream would have in the absence of said particles, a shape that cannot entirely encompass some of said objects In another related aspect, the invention involves a method for encapsulating or sorting colloidal objects, comprising the step of flowing said objects in a first flow stream partly or fully surrounded by a second flow stream in a channel with a narrow strait, wherein along an elongated part of the path of said first stream, the bidimensional size of said first flow stream is smaller than the largest bidimensional size of at least some of said objects, and preferably smaller that the smallest bidimensional size of said objects, or the smallest unidimensional size of said first flow stream, and preferably the largest unidimensional size of said first flow stream, is smaller than the largest unidimensional size of at least some of said objects, and preferably smaller that the smallest unidimensional size of said objects. By bidimensional size, one means here the area of a cut of the flow stream or object, respectively, by a plane locally perpendicular to the general direction of the flow. For a flow stream with substantially uniform section, for instance, said bidimensional size is given by the cross section of the flow stream. By unidimensional size of an object or flow stream one means here the length of the linear segment that can be drawn across said segment or flow stream, along a line roughly perpendicular to the direction of the flow.

For some complex shapes of flow streams or particles, it may not be easy to determine the bidimensional sizes or unidimensional sizes, as described in the definitions above. Thus, it is useful to characterize the invention by other equivalent but more operational and implementation-independent means, referring to the behaviour of the flow streams in the absence and in the presence of the objects to be sorted, all other parameters of the system being kept unchanged. Accordingly, the invention also relates to a method for encapsulating or sorting colloidal objects, comprising the step of flowing said objects in a first flow stream partly or fully surrounded by a second flow stream in a channel with a variable section, wherein said first flow stream is splitting, in the absence of said objects, into droplets with a volume smaller than the volume of at least some of said objects.

The invention also relates to a method for encapsulating or sorting colloidal objects, comprising the step of flowing said objects in a first flow stream partly or fully surrounded by a second flow stream in a channel with a variable section, wherein said first flow stream has, along an elongated part of the path of said first stream and in the absence of said objects, a shape that would not be able to entirely encompass some of said objects In yet another related aspect, the invention involves a method for encapsulating or sorting colloidal objects, comprising the step of flowing said objects in a first flow stream partly or fully surrounded by a second flow stream in a channel with a variable section, wherein the smallest unidimensional size of said first flow stream is smaller than the largest unidimensional size of at least some of said objects, and preferably smaller that the smallest unidimensional size of said objects.

In another related aspect, the invention involves a method for encapsulating or sorting colloidal objects, comprising the step of flowing said objects in a first flow stream partly or fully surrounded by a second flow stream in a channel with a variable section, wherein the section of said first flow stream in at least a part of said channel has a dimension smaller than the section of said objects.

The invention also relates to a method for encapsulating and sorting colloidal objects, comprising the step of flowing said objects in a first flow stream partly or fully surrounded by a second flow stream in a microchannel, wherein said microchannel has a narrowed section and a bifurcation following said narrow section, and said first flow stream is not symmetric with regards to the axis of said microchannel in said narrowed section.

In another aspect, the invention relates to a device for encapsulating or sorting objects, comprising a microfluidic channel network comprising a micro fluidic channel network for the encapsulation or sorting of colloidal objects comprising:

a) a first flow focusing region with an interior inlet to introduce a first fluid containing said object, and one or several secondary inlets to introduce at least a second fluid, said secondary inlets being geometrically designed so that said first fluid is surrounded by said second fluid on at least two sides, b) a second elongated portion with a section smaller than the sum of the sections of said central inlet and said secondary inlets.

In one preferred aspect of the invention, the first flow stream is not centered in the second elongated portion.

In another aspect, the invention relates to a method for screening objects for a given property or activity, comprising the step of encapsulating said objects by flowing them in a first flow stream partly or fully surrounded by a second flow stream in a channel with a variable section, wherein the section of said first flow stream in at least a part of said channel has a dimension smaller than the section of said objects.

Regarding the fluids used as first and second fluid in the above embodiments, they can be miscible or immiscible, and can be of various relative viscosities.

In one particularly interesting embodiment, they are immiscible.

In a second interesting embodiment, said first fluid is a material that can be hardened by a subsequent treatment, such as a polymerizable material, a crystallisable material, or a melted material that can be solidified by a reduction of temperature.

In yet another aspect, the invention relates to a microfluidic network for encapsulating and manipulating material, comprising the step of:

a) a first flow focusing region with a central inlet to introduce a first fluid containing said object, and one or several secondary inlets to introduce at least a second fluid, said secondary inlets being geometrically designed so that said first fluid is surrounded by said second fluid on at least two sides, b) a second elongated portion with a section smaller than the sum of the sections of said central inlet and said secondary inlets, c) a third portion with a width larger that the section of said second elongated portion, splitting into two outlet microchannels In one aspect, microfluidic networks according to the invention may also comprise in addition to the elements recited above, a least one supplementary inlet allowing the introduction of a third fluid miscible with said first fluid, in fluidic communication with at least one said outlet micro fluidic channels.

DETAILED DESCRIPTION OF PREFERRED EMBODIMENTS

Definitions

Figure 1:
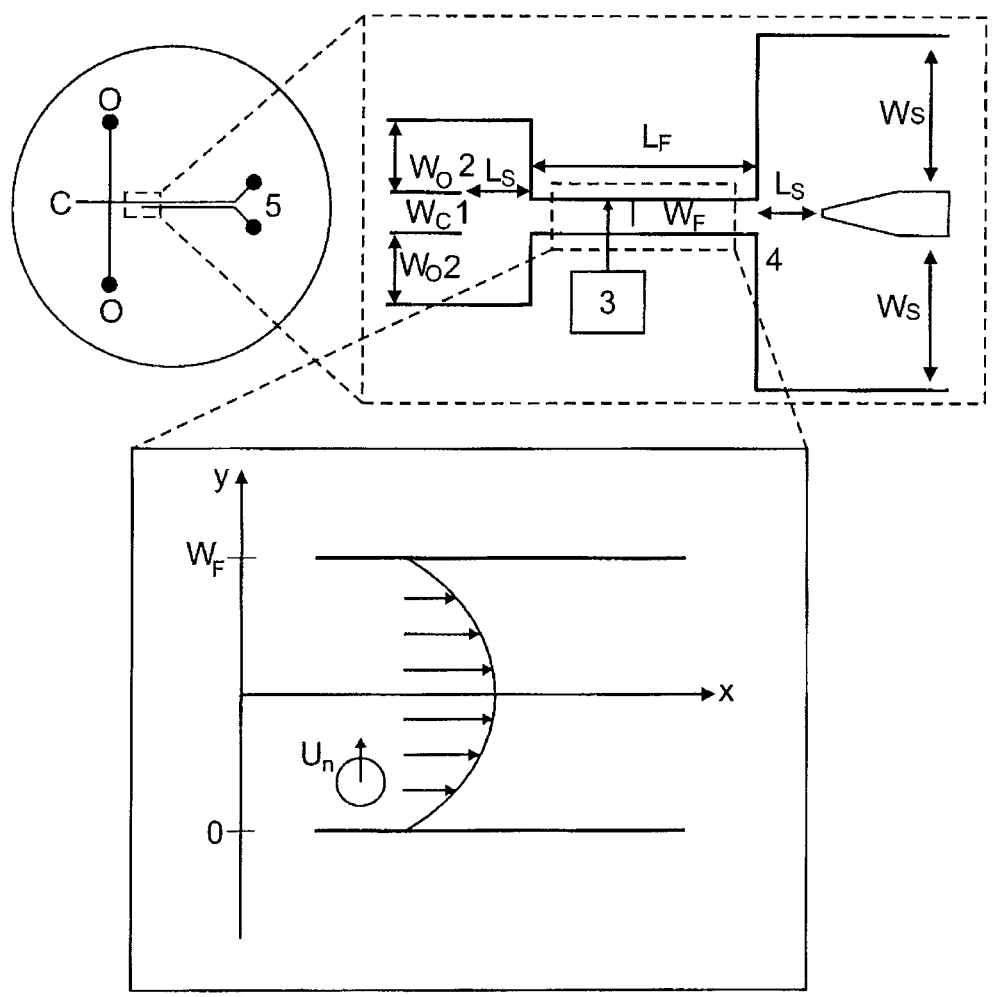
FIG. 1 represents an exemplary realization of a microfluidic device used for the invention

The following definitions will aid in the understanding of the invention. As used herein, the term "fluid" generally refers to a substance that tends to flow and to conform to the outline of its container. Typically, fluids are materials that are unable to withstand a static shear stress. When a shear stress is applied to a fluid, it experiences a continuing and permanent distortion. Typical fluids include liquids (e.g., water or aqueous solutions) and gases (e.g., air, $O_2$, $N_2$, etc.), supercritical fluids, and the like. The fluid may have any suitable viscosity, for example, a viscosity similar to water (e.g., as in an aqueous solution), oil, etc. In certain embodiments of the invention, the liquid may include an oil or an organic solvent, such as those known to ordinary skill in the art. Particularly suitable for the invention, are fluid systems involving a first aqueous liquid, and a second liquid mainly composed of mineral oil, vegetal oil, silicone oil, or fluorocarbon oil. The at least two fluids used within the invention fluid may be independently selected among essentially any fluids (liquids, gases, and the like) by those of ordinary skill in the art, by considering the relationship between the fluids. The fluids may each be miscible or immiscible. Those of ordinary skill in the art can select suitable miscible or immiscible fluids, using contact angle measurements, tables of interfacial energies, and the like. They can also adapt the interfacial tension between the fluids to obtain desired properties of the fluids such as jetting of one fluid in the other, onset of Rayleigh-Plateau instability, shear-driven drift, and the like, using suitable surfactants.

As used herein, the term "flow stream" refers to the flow of a fluid in a specific direction, which may change along the direction of the flow. The flow stream may be continuous and/or discontinuous. The flow stream may be laminar, or turbulent in some cases. Preferably, however, for implementation of the invention one shall use laminar flow streams. The continuous fluidic stream may be, e.g., compact or hollow (i.e., containing a second fluid internally, for example, as in a hollow tube).

Depending on the shape of the microchannels in which said flow streams are created, they can have all sorts of shapes. In particular the shape of the microchannel may not be a simple symmetrical shape, although the invention can be conveniently implemented in microchannels with a rectangular section.

When a fluid, or a combination of fluids, is flowing in an elongated microchannel, one can define a streamline, or a stream surface, at which shear is zero. For a cylindrical channel, this zero shear streamline is the axis of the channel. For a "slab" rectangular microchannel, shear is essentially zero along a planar two dimensional region, corresponding to the middle plane of the channel. Herein, "zero-shear" zone, is used to define the line or surface corresponding to minimal shear along the channel, whatever its geometry.

Similarly, a "discontinuous" flow stream is divided in single entities, such as droplets, vesicles, or plugs. In some cases, the droplets may be spherical or substantially spherical; however, in other cases, the droplets may be non-spherical, for example, the droplets may have the appearance of "blobs" or other irregular shapes, for instance, depending on the external environment, and on their interfacial tension.

As used herein, a first flow stream is said "surrounded" by one or several second flow streams if the fraction of its outer surface in contact with at least one of said second flow streams, rather than in contact with the channel's walls, is larger than 50%. If this fraction is exclusively comprised between 50% and 100%, it is said "partly surrounded". If it is 100%, the first flow stream is said "fully surrounded" by said second flow streams.

As used herein, the term "size", when referring to a flow stream, relates to its dimensions in a plane essentially perpendicular to the main direction of flow. Depending on the context, and particularly depending on the nature of the quantity it is compared to, the term "size" can represent an area, then it is called "bidimensional size" or a length, then it is called "unidimensional size". When "size" represents an area, it is typically the surface of a cut of the flow stream by a plane perpendicular to the flow direction. In some cases, for instance when the flow stream has a complex shape, the size can be better represented as the smallest convex surface encompassing entirely the flow stream. If "size" is used to designate a length, typically it represents the length of a linear segment, joining two opposite points on the perimeter of a cut of the flow stream by a plane perpendicular to the flow, and passing by the center of mass of said cut. As mentioned above, for flows of complex shape, said cut may be replaced by the smallest convex envelope encompassing entirely said cut. If the cut is of non-circular shape, then all segments as defined here do not have the same length: one then defines the "smallest size", as the smallest of these segments, and the "largest size", as the largest of these segments. To better exemplify the above definitions, for a parallelepipedal flow stream, as occurring e.g. in the stream of the exemplary device drawn in FIG. 1, the bidimensional size is the area of the rectangular cut of the flow stream perpendicular to the channel axis. The "smallest unidimensional size" of the flow stream, is the small side of this rectangle, and the "largest unidimensional size" of this flow stream is the diagonal of this rectangle.

As used herein, a fluid is said "hardenable", if it can undergo a transition to a solid state, a gel state, a viscoelastic state, and generally speaking a state in which it is able to keep its shape, as opposed to the behavior of a liquid. This can be achieved by using as first fluid a polymerizable material, or a crosslinkable material. More preferable, this polymerization or crosslinking can be triggered in the microchannel network, e.g. by photoactivation, e.g. if said polymerizable material contains a photoactivator, or by thermal activation, e;g. by bringing at least a part of said microchannels network to a high temperature. As a second embodiment, this can be achieved by using as first fluid a material that can change its viscosity or elastic modulus by temperature. As an example, the liquid could be a melted material, that can recover a glassy, crystalline or semicrystalline state, by a decrease in temperature. The first liquid could also be a material that can transit to a gel state by a decrease in temperature, such as e.g. a water suspension of agarose then, the invention can be implemented preferably by having, downstream of the flow-focusing region, a region with a temperature lower than that of the entering first fluid. Oppositely the first liquid can comprise a material able to gelify by an increase in temperature, such as poly-N-Isopropyl Acrylamide (PNIPAM). Various additional ways of hardening material, usable for the invention, are recited e.g. in U.S. Pat. No. 6,558,665 to Cohen, or in the "Polymer Handbook", J. Brandrup et al. eds, Wiley, incorporated herein by reference. Hardening of said fluid can also be obtained by a combination of above effects, first hardening the material by a fast thermal effect, and then making the hardening irreversible by a chemical effect, such as cross-linking or polymerizing. The hardenable fluids can be selected, depending on the desired application, to be after the hardening step, permeable or impermeable to specific species. The first fluid can also be hardened by diffusion in said first fluid of a reagent contained in a second fluid by which said first fluid is partly or fully surrounded. An a non-restrictive example, said first fluid may contain sodium alginate, and second fluid can contain oleic acid and calcium chloride.

As used herein, "microfluidic," "microscopic," "microscale," the "micro-" prefix (for example, as in "microchannel"), and the like generally refers to elements or articles having widths or diameters of less than about 1 mm, and less than about 100 microns (micrometers) in some cases. Additionally, "microfluidic," as used herein, refers to a device, apparatus or system that includes at least one microscale channel.

A "channel", as used herein, means a feature on or in an article (e.g., a substrate) that at least partially directs the flow of a fluid. In some cases, the channel may be formed, at least in part, by a single component, e.g. an etched substrate or molded unit. The channel can have any cross-sectional shape, for example, circular, oval, triangular, irregular, square or rectangular (having any aspect ratio), or the like, and can be covered or uncovered (i.e., open to the external environment surrounding the channel). In embodiments where the channel is completely covered, at least one portion of the channel can have a cross-section that is completely enclosed, and/or the entire channel may be completely enclosed along its entire length with the exception of its inlet and outlet.

A channel may have in at least some of its sections an aspect ratio (length to average cross-sectional dimension) of at least 2:1, more typically at least 3:1, 5:1, or 10:1. As used herein, a "cross-sectional dimension", in reference to a fluidic or microfluidic channel, is measured in a direction generally perpendicular to fluid flow within the channel. In an article or substrate, some (or all) of the channels may be of a particular size or less, for example, having a largest dimension perpendicular to fluid flow of less than about 5 mm, less than about 2 mm, less than about 1 mm, less than about 500 microns, less than about 200 microns, less than about 100 microns, less than about 60 microns, less than about 50 microns, less than about 40 microns, less than about 30 microns, less than about 25 microns, less than about 10 microns, less than about 3 microns, less than about 1 micron, less than about 300 nm, less than about 100 nm, less than about 30 nm, or less than about 10 nm or less in some cases. In one embodiment, the channel is a capillary. Of course, in some cases, larger channels, tubes, etc. can be used to store fluids in bulk and/or deliver a fluid to the channel.

The term "microsystem" as used herein, refers to a device involving deliberate and functional microstructures, prepared by a process involving in one of its step microfabrication of self-assembly.

The term "microfluidic" as used herein to further qualify a microsystem is to be understood, without any restriction thereto, to refer to structures or devices through which fluid(s) are capable of being passed or directed, wherein one or more of the dimensions is less than 500 microns. In some embodiments, microfluidic systems involve microchannels.

The term "microchannel" as used herein is to be interpreted in a broad sense. Thus, it is not intended to be restricted to elongated configurations where the transverse or longitudinal dimension greatly exceeds the diameter or cross-sectional dimension. Rather, such terms are meant to comprise cavities, tunnels or three dimensional structures of any desired shape or configuration. Such a cavity may, for example, comprise a flow-through cell where fluid is to be continually passed or, alternatively, a chamber for holding a specified, discrete amount of fluid for a specified amount of time.

The term "microchannels array" designates an ensemble of at least two, non connected, microchannels, microfabricated in the same substrate. A microchannels array may involve microchannels that are in addition involved in microchannels networks, thus leading to an array of microchannel networks.

As used herein, the term "microchannel network" refers to one or more microscale channels that are disposed between two substrates, or integrally surrounded by a substrate, and are in fluid communication, or can be put in fluid communication with each other thanks to a microvalve integrated in the substrate.

As used in the present description, the term "colloidal objects" can represent a large variety of compounds, including cells, organelles, viruses, cell aggregates, cell islets, embryos, pollen grains, artificial or natural organic particles such as latex particles, dendrimers, vesicles, magnetic particles, nanoparticles, quantum dots, metal microparticles, metal nanoparticles, organometallic micro or nanoparticles, nanotubes, artificial or natural macromolecules, microgels, macromolecular aggregates, proteins or protein aggregates, polynucleotides or polynucleotide aggregates, nucleoproteic aggregates, polysaccharides, or supramolecular assemblies, or combinations of the hereabove compounds. The term "particle" will be used in the text, with the same meaning as "colloidal object".

As used herein, the term "size", when referring to a particle, relates to its dimensions in a plane encompassing its center of mass. Depending on the context, and particularly depending on the nature of the quantity it is compared, the term "size" can represent an area, then it is called "bidimensional size" or a length, then it is called "unidimensional size". When "size" represents an area, it is typically the surface of a cut of the particle by a plane perpendicular to the flow direction. In some cases, for instance when the particle has a complex shape, the size can be better represented as the smallest convex surface encompassing entirely said cut. If the particle is spherical, its bidimensional size is the area of its cut, $\Pi R^2$, where R is its radius. If it has a more complex shape, however, it can have several bidimensional sizes depending on the plane used to make the cut. For instance, for an ellipsoidal particle, the smallest bidimensional size is the area of the cut by a plane encompassing its two smallest axis, whereas the largest bidimensional size is the area of the cut by a plane encompassing its two largest axis, If "size" is used to designate a length, typically it represents the length of a linear segment, joining two opposite points on the perimeter of a cut of the particle by a plane encompassing its center of mass of said cut. As mentioned above, for particles of complex shapes, such as porous particles, said cut may be replace by the smallest convex envelope encompassing entirely said cut. If the particle is spherical, its unidimensional size is its diameter If the particle is of non-spherical shape, then one can define its "smallest unidimensional size", as the smallest of linear segments as defined above, and the "largest unidimensional size", as the largest of these segments. For instance, for ellipsoidal particles, its smallest unidimensional size is its short axis, and its largest unidimensional size is its large axis. Finally, if particles are not spherical and tend to orient, e.g. in a flow, one can define more specifically its largest and smallest unidimensional size, in directions referred to a special direction, for instance its largest unidimensional size in a plane perpendicular to the flow axis, or along the flow axis.

As used here, the term "reagent" can comprise any type of molecule, particle, combination of particles, molecules or species, aimed at interacting with colloidal particles involved in the invention. As an exemplary and non-limitative lists, they can be chemicals, drugs, nucleic acids, combinations of nucleic acids and enzymes, such as mixtures used for DNA amplification, antibodies, fluorescent moieties, luminescent moieties, dyes, nanoparticles, gold nanoparticles, quantum dots, DNA intercalating dyes, aptamers, or any types of species putatively able to affect the metabolism of cells, or the properties of colloidal objects according to the invention, in particular their optical properties.

The indefinite articles "a" and "an," as used herein in the specification and in the claims, unless clearly indicated to the contrary, should be understood to mean "at least one".

As used herein, "or" should be understood to mean inclusively or, i.e., the inclusion of at least one, but also possibly more than one, of a number or list of elements. Only terms clearly indicated to the contrary, such as "only one of" or "exactly one of," will refer to the inclusion of exactly one element of a number or list of elements.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements that the phrase "at least one" refers to, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Herein, "active sorting" in a device, is used to designate a way to separate components, such as droplets or more generally individual compartments, by the process of i/ detecting a property of said component, and ii/ activating a means to direct said component in a specific direction, depending on said property In a micro fluidic network, for instance, said direction may be a particular outlet of said network. Properties used for said sorting may be, for instance, a level of fluorescence, the size, a level of light absorbion, or an electric property, such as an impedance, a polarizability, a dielectrophoretic mobility.

Means to direct said components can be different, but in "active sorting", they share the property of activating a means able to modify the trajectory of a component, said means being activated differently, depending on the result of said properties. For instance, said means can be a valve, closing or opening a specific channel, or a change in flow, directing said component in a different outlet, or a magnetic field, or a DC electric field, or an AC electric field, or light.

Embodiments

Keeping in mind these definitions, the invention first relates to a method for encapsulating or sorting colloidal objects, comprising the step of flowing said objects in a first flow stream partly or fully surrounded by a second flow stream in a channel comprising a narrow strait, wherein along an elongated part of the path of said first flow stream either (a) the bidimensional size of said first flow stream is smaller than the largest bidimensional size of at least some of said objects, (b) the smallest unidimensional size of said first flow stream is smaller than the largest unidimensional size of at least some of said objects, either (c) said first flow stream is splitting, in the absence of said objects, into droplets with a volume smaller than the volume of at least some of said objects, or (d) said first flow stream would have in the absence of said particles, a shape that cannot entirely encompass some of said objects Preferably, said bidimensional size of said first flow stream in the strait is smaller than the smallest bidimensional size of at least some of said objects, or said smallest unidimensional size of said first flow stream in the strait is smaller than the smallest unidimensional size of at least some of said objects.

Figure 2:
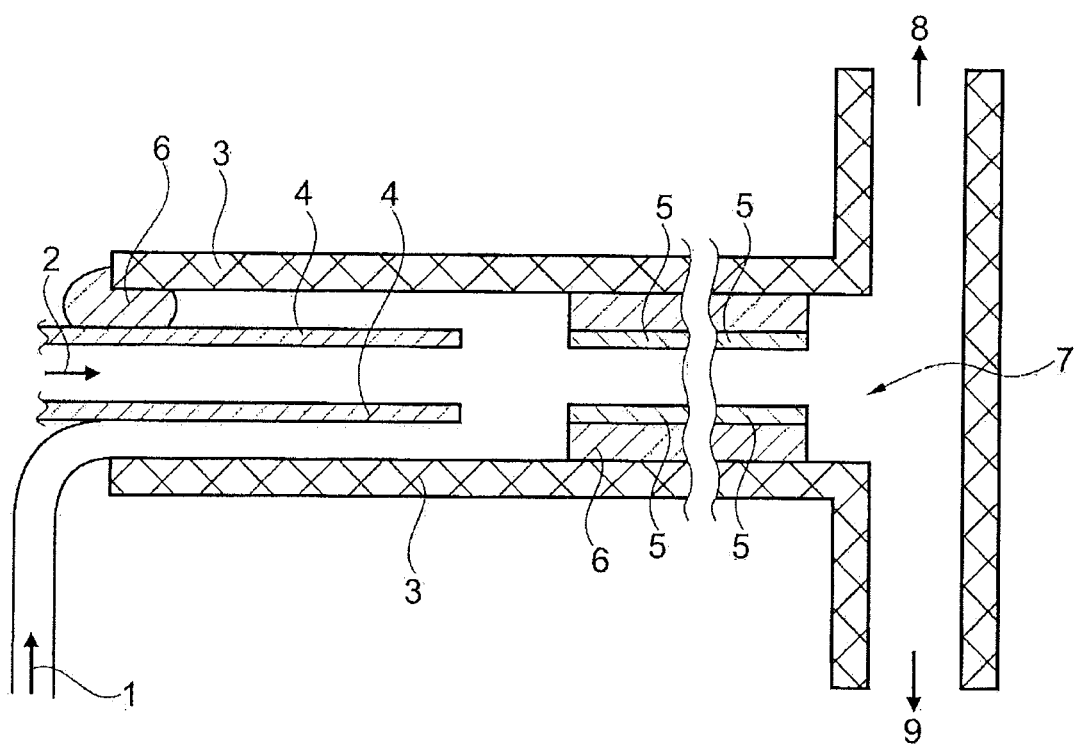
FIG. 2 represents another exemplary possible embodiment of the invention.

The characteristics of the invention can be better understood with reference to an exemplary embodiment provided in FIG. 1: (top view). Upper left represents a general layout of a microchannel network usable for implementing the invention. Following this layout, the microchannel network (white areas in the figure) can be prepared in a single step as grooves with a roughly rectangular or rounded section of constant depth in a substrate by microlithography techniques. In other embodiments, however, the invention may also involve channels of different depths. The invention may also be implemented by those skilled in the art, using more conventional chromatography materials, such as tubes and connectors, as shown e.g. in FIG. 2. This embodiment comprises a first capillary 3, for instance a square capillary, connected to a positive outlet capillary (8) and a negative outlet capillary or waste, (9) at a T junction (7). A first flow stream (2) containing the objects to be encapsulated is introduced in a smaller capillary (4) threaded into capillary (3) in an out-of-axis fashion. A second carrier fluid (1) is introduced in the larger capillary (3) in a way to surround at least partially capillary (4). Additionally, the main capillary (3) contains a second smaller capillary (5) between the first smaller capillary (4) and the T junction (7), playing the same role of flow focusing as the strait (central part of the device) in FIG. 1 However, the invention is particularly suitable for implementation in microfabricated channel networks. Numerous methods for microfabrication, and numerous materials usable for the fabrication of micro fluidic networks, are known from those skilled in the art, and can be used within the invention (see e.g. Zadouk, R., Park B Y, Madou, M J, Methods Mol. Biol. 321, 5, (2006), incorporated herein by reference. Also, the substrates carrying the microfabricated networks within the invention can have any shape. Preferably, though, they are planar, or comprised in a developable substrate, such as a polymer film or sheet. Optionally, they may be deformable, and can comprise microfabricated valves, pumps, membranes, filters, microstructures, integrated optics, electrodes, detection units, surface treatments, and all kinds of microfluidic components and technologies, as recited e.g. in Micro Total Analysis Systems 2005, K. F. Jensen, J. Han, D. J. Harrison, J. Voldman Eds, TRF press, San Diego, Calif., USA., incorporated herein by reference "c" denotes the inlet for a first liquid usable as a first flow stream type, containing the colloidal objects. "o" denotes inlets for a second liquid usable to create said second flow streams. The right part of the figure show the details of the region in which the invention is implemented. Colloidal objects enter the region as a suspension in a flow stream of a carrying fluid by the central left channel (1, $W_c$). This flow stream is sandwiched by two flow streams of another fluid entering by the two lateral left inlets (2, $W_o$). Here, the lateral inlets are two, but different arrangements can be implemented within the invention: In particular, second fluid inlets can be more than two, or in contrast a single inlet, in a shape such than the first flow stream is at least partly surrounded by said second flow stream. In particular, said second inlet could be a pipe entirely surrounding the first inlet Wc.

The three flow streams converge into the central channel with a reduced section, 3 noted $W_F$. This corresponds to a "flow focusing" geometry, as described e.g. in WO 2004/002627 A2 to Stone et al. In contrast with prior art, as described above or e.g. in Xu, Q. & Nakajima, M. *Applied Physics Letters* 85, 3726-3728 (2004), Yobas et al. *Lab Chip* 6, 1073 (2006), incorporated herein by reference, the invention comprises an elongated narrow portion, or "strait". This strait has a total section smaller than the sum of the sections of the flow focusing region, in which said first flow stream encounters second flow stream(s). By definition, and in contrast with the apertures used in prior art, this strait extends on a significant length. Typically, it extends on a length equal to at least 2 times, and preferably more than 10 times, the square root of its smaller section. In a privileged implementation this strait is a rectangular channel of uniform section. FIG. 1c represents a typical flow profile in this narrowed section, or "strait". In this particular and exemplary implementation, the zero shear zone is a plane perpendicular to the drawing's plane, encompassing line Ox. An important advantage of the invention, as regards to prior art, is that the colloidal objects to be treated be prevented to touch the microchannel's walls, on at least on two opposite sides of the first flow stream, and preferably all over the flow stream, by the second flow streams. In the present exemplary layout, this effect is accomplished, in the plane of the figure, by the two streams entering by inlets Wo, and in the direction perpendicular to the drawing, by the fact that all channels have the same thickness, so that first flow stream is not flow-focused in that direction, so that particles do not tend to collide with the wall.

In the present implementation, the strait ends up in a widened section, 4. Optionally, this widened section can be split into at least two different outlets. With a suitable tuning of the flow streams, as will be more clearly explicated in the examples, the invention can be implemented so that the wanted colloidal objects exit preferably by one exit, and the unwanted ones exit preferably by one or several other exit(s).

In one aspect of the invention, it is used for encapsulating colloidal objects. The flows entering the first and second inlets, are tuned so that at least one dimension of the first flow stream in the strait be smaller than at least some dimension of at least some of the objects to be encapsulated. Depending on the geometries of the microchannels and of the objects to be sorted, it will be more convenient to refer to said dimensions in terms of surface of length. For instance, in the embodiment of FIG. 1, involving a micro fluidic network with rectangular channels of uniform depth, it is most suitable, for implementation of the invention, to use as the dimension of the first flow stream its width in the plane of the drawing. For more complex geometries, such as a pipe, it may be more suitable to use the flow stream's section.

If particles are spherical, their largest dimension is naturally defined as their diameter (if the flow stream is characterized by a length, as is the example above), or by their largest section (if the flow stream is characterized by its section, as e.g. in a pipe). For particles of more complex shape, and depending on cases, dimensions can be characterized by the area of a cut of the object passing by its center of mass (if the flow stream is characterized by a sectional area), or by the distance between two opposite sides of the particles, along a line passing by its center of mass (if the flow stream is characterized by a width, or more generally by a quantity homogeneous to a length).

The common feature of all these definitions, is that the first flow stream is tuned, so that it cannot encompass at least some of the objects to be encapsulated or sorted, without being itself deformed from the shape it would have in the absence of said objects. Then, the objects deform said first flow stream, and are surrounded by a layer of the corresponding fluid. Then, encapsulation can be easily performed by different ways.

Upon a first embodiment, encapsulation is obtained by hardening said first fluid, which is a hardenable fluid. This can be obtained by many different means known by those skilled in the art.

In another embodiment, which can be combined with the above ones, encapsulation can be achieved by using for creating said second flow stream or said second flow streams, a liquid not miscible with said first flow stream. Then, the first flow stream can be continuous, or it can be discontinuous, i.e. split in many droplets: Continuous flow streams are obtained at high flow velocities, and discontinuous ones at lower velocities, as exemplified e.g. in example 2 and FIG. 3. In both cases, it is a consequence of the dimensional characteristics of the invention (recited above), that the passage of the objects to be encapsulated or sorted, in the strait, induces the breaking of said flow into a droplet encapsulating said objects. If the first flow is of the discontinous type, i.e. break in spontaneous droplets, these spontaneous droplets are smaller than the droplets surrounding said objects. Typically, droplets containing colloidal objects are larger than spontaneous droplets by a factor of 1.5, and preferably by a factor of at least 1.8.

In a privileged embodiment, the invention is used for sorting colloidal objects. Generally, this sorting if facilitated by the fact that said objects are encapsulated in droplets, or in a hardened layer of a first fluid, as described above. Thus, the invention is particularly interesting for performing the simultaneous encapsulation and sorting of colloidal objects. In contrast to prior art, as described e.g. in WO2006/040551 to Griffiths, this sorting does not require any active component such as electrodes or flow switching, and it can be performed spontaneously within the invention using the laws of hydrodynamics. Thanks to the specific advantages of the invention, the droplets, or the hardened fluid surrounding said objects, have a dimension larger than that of droplets or first fluid particles not containing colloidal objects. Thus, it becomes easier to sort apart these empty droplets or particles, from those containing colloidal objects.

Thus the invention is particularly interesting for sorting colloidal objects.

In a privileged embodiment, this sorting is achieved by tuning inlet flows so that the first flow stream containing the colloidal objects travels in the strait, at a position not centered with the flow line(s) of minimal shear stress. If the strait has a rectangular section, for instance, this means that the first flow stream is not centered with regards to the axis of the channel, as apparent e.g. in FIGS. 4 and 5 and examples 4 and 5.

Figure 6:
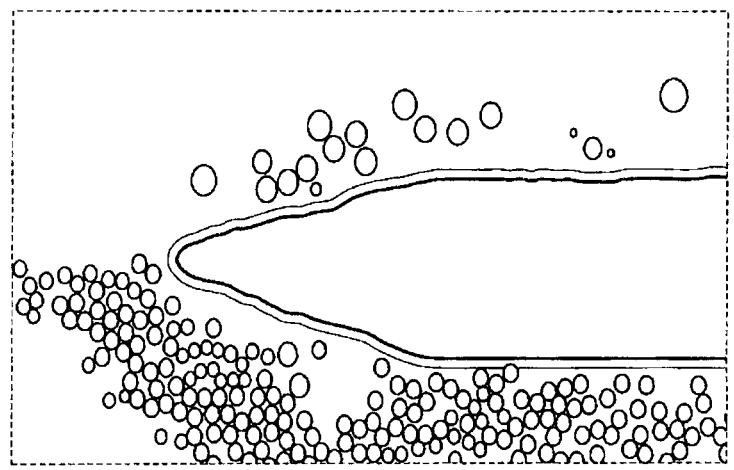
FIG. 6 is a picture showing the efficiency of encapsulation of cells in droplets, and of the subsequent sorting of large positive droplets from smaller negative droplets, in a device according to the invention

If the micro fluidic network used for implementing the invention is symmetric, this can be achieved by creating a dissymmetry between the flows provided on both sides of the first flow stream. Then, colloidal objects are situated in a shear, and they are subjected to a mechanism called shear-driven drift, as described e.g. in P. C.-H. Chan, L. G. Leal, *J. Fluid Mech.* 92, 131-170 (1979), incorporated herein by reference. Suspensions of deformable particles in a shear flow of a Newtonian fluid, or suspensions of either deformable or undeformable particles in a non-newtonian fluid, undergo a lateral motion towards the streams of higher speed, a mechanism called shear-induced drift. This drift is a strong function of the droplet diameter Φ (proportional to $Φ^3$). Due to the asymmetric positioning of the jet in the strait, during the short time (a few tenths of milliseconds) they spend in the focusing region, big positive drops are driven towards the channel's center whereas smaller negative drops remain on a lower streamline. They can then be selected, at the outlet of the strait, by directing different flow lines in different outlets, as shown e.g. in FIG. 6.

Applications of the Invention

The invention can be useful for numerous applications, involving the encapsulation, manipulation sorting and screening of biological cells, molecules, libraries, for the high throughput synthesis of molecular or biomolecular libraries.

For instance, the invention can be used for encapsulating and sorting cells, as described in example 1, 4 and 5.

The invention can also be used to encapsulate and manipulate latex beads. In a particularly useful application, it can be useful to encapsulate microparticles on which particular ligands are grafted. Thanks to the advantage of the invention, to encapsulate one and only one particle in a capsule, this allows to perform in each capsule a chemical or biochemical reaction, without any risk of mixing the products obtained by reaction on different particles.

Thus, the invention allows to perform all kind of library screenings, directed evolution, aptamers selection, and the like. Examples of such applications are recalled e.g. in PCT application WO 2006/040551 To Griffiths, in patent application US 2006/0051329 A1 to Lee, or in US patent application 2006/228721 to Rothberg, Us patent application 2002/0106670 to Burgess, or in Lidstrom, M. E. & Meldrum, D. R. *Nat. Rev. Microbiol.*, 1, 158-164 (2003)., El-Ali, J., Sorger, P. K. & Jensen, K. F. Cells on chips. *Nature* 442, 403-411 (2006), or Cai, L., Friedman, N. & Xie, X. S. *Nature* 440, 358-362 (2006), Griffiths, A. D. & Tawfik, D. S. U, 24, 395-402 (2006), these different applications being incorporated herein by reference, and more generally any protocols in which it is advantageous to compartmentalize species in a large number of independent reservoirs of small volumes.

It is thus another object of the invention, to provide a method for creating a dispersion of a first fluid containing at least a first type of colloidal objects, into individual compartments suspended in a second fluid, wherein more than 50%, and preferably more than 70% of said compartments contain one and only one of said colloidal objects wherein said objective is reached without involving an active sorting of said compartments. By "active sorting", we mean the action of measuring at least one property of at least some of said compartments, and activating some means to modify the track of said compartment, depending on the result of said measure. Examples of active sorting are given e.g; in "MicroTotal Analysis Systems 2006, Kitamori et al. Eds, CHEMINAS, publ., Japan, ISBN 4-9903269-0-3-C3043, pp 984-986, Perroud et al, or pp 570-572, Haeberle et al., which is incorporated therein by reference.

It is an other object of the invention to provide a method to encapsulate under microfluidic control objects of submillimeter size, into droplets or hardened capsules, wherein said droplets or capsules have a volume no larger than 10 times the volume of the object, preferable no larger than 5 times said volume, and even preferable no larger than 3 times said volume.

Notably, the invention can be used to encapsulate colloidal objects into liquid droplets in suspension in a non-miscible fluid, or in a hardened capsule. In some embodiments, said colloidal objects can themselves be droplets, or capsules, allowing for a particularly useful and convenient ways of making double emulsions, or multishell particles. In particular, in embodiments comprising microfabricated microchannel, it is easy to integrate into the microfabrication process further microfluidic components, such as a flow-focusing encapsulation geometry, in order to deliver to the inlet 1 of the invention, colloidal objects in the form of droplets or hardened capsules, or colloidal objects encapsulated in droplets or hardened capsules. In other embodiments, it is also possible to combine, in the same microchip, or to connect several microfluidic arrays of the invention, in order to apply the method of the invention in a cascade. For instance, a second microfluidic array of the invention, or a different type of microfluidic emulsification device, can be connect at one of the outlets 5, in order to prepare sorted colloidal objects entrapped in a double emulsion.

It is also possible, in a privileged embodiment, to connect at least one outlet of the microchannel according to the invention, at least one, and optionally several, third inlet (s), allowing to introduce in said outlet channel reagents. Preferably, these reagents are dissolved or suspended in a fluid miscible with the fluid comprised in the first flow stream.

In yet another embodiment, at least one outlet of the microchannel may advantageously comprise a region where two or more droplets can be coalesced. Exemplary implementations of such coalescence devices can be found e.g. in European patent application EP/1637226 to Viovy. This embodiment is particularly interesting in combination with embodiments involving at least one inlet allowing the introduction of reagents in the form of droplets: then it is possible to coalesce a droplet containing a colloidal particle of interest, and another droplet containing a reagent able to react with said particle.

As an example, said reagent can be a "PCR mix", "RT mixes", or mixes used for PCR amplification methods known as "NASBA" or "Rolling circle amplification". This embodiment is particularly useful if the colloidal objects compartmentalized or sorted using the invention are individual cells (then one can analyse the genome or the transcriptome of these cells), particles with grafted nucleic acids, or droplets containing subsets of the genome or of the transcriptome of an organism.

As another example, said reagent can be a composition suitable for performing immunoassays, in order to check for the proteic or for the peptidic content of the compartmentalized colloidal objects As yet another example, said reagent can be a composition suitable for performing protein analysis, in order to check for the proteome of a biological compartmentalized colloidal objects, and notably a cell or a cell aggregate.

In another priviledged embodiment, the invention can be useful to encapsulate cells, or cancer cells, or stem cells, and to screen for at least one property of said cells, such as, as an exemplary and non restrictive list, their genome, transcriptome, proteome, genotype, phenotype, resistance to drug, and the like.

As a summary, it is thus an object of the invention, to provide a method for encapsulating or sorting colloidal objects, comprising the step of flowing said objects in a first flow stream partly or fully surrounded by at least one second flow stream in a channel comprising a narrow strait, wherein along an elongated part of the path of said first flow stream either (a) the bidimensional size of said first flow stream is smaller than the largest bidimensional size of at least some of said objects, either (b) the smallest unidimensional size of said first flow stream is smaller than the largest unidimensional size of at least some of said objects, either (c) said first flow stream is splitting, in the absence of said objects, into droplets with a volume smaller than the volume of at least some of said objects, or (d) said first flow stream would have in the absence of said particles, a shape that cannot entirely encompass some of said objects Preferably, the bidimensional size of said first flow stream is smaller than the smallest bidimensional size of at least some of said objects In another preferred embodiment, the section of said first flow stream is smaller than the smallest section of at least some of said objects.

In another preferred embodiment, the smallest unidimensional size of said first flow stream is smaller than the smallest unidimensional size of at least some of said objects.

In a preferred embodiment, the method of the invention can be used for the simultaneous encapsulation and sorting of colloidal objects In a yet preferred embodiment, said first flow stream does not comprise, in the narrow strait, flow lines corresponding to a minimum in the shear stress. This feature facilitate differential drift of encapsulated objects depending on their size, and thus provides a means for their sorting, as exemplified in more detail below.

In one family of preferred embodiments, said first flow stream involves a first liquid, and said second flow stream or said second flow streams involve at least one second liquid, miscible with said first liquid.

In another family of preferred embodiments, said first flow stream involves a first liquid, and said second flow stream or said second flow streams involve at least one second liquid, immiscible with said first liquid. Within embodiments involving immiscible first and second flow streams, it is particularly advantageous, to select the flows of said first and second flow streams, such that said first flow stream splits into droplets in said microfluidic channels.

In some preferred embodiments, said first liquid is a hardenable material, such as a polymerizable material, a crystallisable material, or a material that can undergo a transition to a glassy state.

In another preferred embodiment, said second liquid has a viscosity larger that the viscosity of said first fluid by a factor of at least two, and preferably by a factor of at least 5.

It is also another object of the invention, to provide methods for at least one of encapsulating or sorting of colloidal objects, wherein said colloidal objects are selected among cells, organelles, viruses, cell aggregates, islet cells, stem cells, embryos, pollen grains, artificial or natural organic particles such as latex particles, dendrimers, vesicles, magnetic particles, nanoparticles, quantum dots, metal microparticles, metal nanoparticles, organometallic micro or nanoparticles, nanotubes, artificial or natural macromolecules, microgels, macromolecular aggregates, proteins or protein aggregates, polynucleotides or polynucleotide aggregates, nucleoproteic aggregates, polysaccharides, or supramolecular assemblies It is yet another object of the invention, to propose a microfluidic channel network for the encapsulation or sorting of colloidal objects comprising at least:

a) a first flow focusing region with an interior inlet to introduce a first fluid containing said objects, and one or several secondary inlets to introduce at least a second fluid, said secondary inlets being geometrically designed so that said first fluid is surrounded by said second fluid on at least two sides, b) a second elongated portion with a section smaller than the sum of the sections of said central inlet and said secondary inlets.

Preferably, said second elongated portion merges into a third widened portion, and yet preferably said third widened portion is split into at least two distinct outlet microchannels In a convenient and priviledged embodiment, said micro fluidic channel network is microfabricated in a planar or developable substrate. Numerous methods for preparing such microfabricated microchannels in a variety of materials such as, given as an exemplary an non-exhaustive list, glass, silicon oxide, silicon, thermoplastic materials, photopolymerized materials, elastomers, resins, epoxies, polystyrene, polymethyl methacrylate and more generally acrylate and methoacrylated materials, polystyrene, polycarbonate, polyethylene Terephtalate, parylene, Peek, fluorinated material, silicone material, Polydimethylsiloxane, cyclic olefin polymers and copolymers, polyimide, ceramics, and the like.

In some preferred embodiment, in order to allow further processing or testing of encapsulated colloidal objects, said microfluidic channels network comprises a third inlet merging into the microfluidic network downstream of said second elongated portion. It may also comprise additionally a coalescence region downstream of the merging region between said microchannel network and said third inlet. Also, it may in some embodiments comprise, one or several temperature-regulated zones. Such regulated zones may be beneficial for the operation of various biological or chemical protocols, such as, as an example, the amplification of nucleic acids, or the reverse transcription of RNA.

It is also an object of the invention, to propose a device for performing at least one of the operations of sorting, encapsulating or preparing colloidal objects, comprising at least:

a) a microfluidic network as described above, b) a source of a first fluid fluidically connected to said central inlet, c) and a source of a second fluid fluidically connected to said secondary inlets.

In a preferred embodiment, said device may comprise at least one outlet to collect at least some of said colloidal objects It may also comprise, in some preferred embodiments useful for the screening of specific properties of said colloidal objects, means for illuminating one part of said microchannel network, or for bringing different parts of said microchannel network at different temperatures.

In a preferred embodiment, said microfluidic channel network also comprises a source for at least a third fluid in fluidic connection with a third outlet, in fluidic connection with said microfluidic channel network. In some advantageous versions of said embodiment, said third fluid comprises a reagent able to interact with at least some of said colloidal objects In another preferred embodiment, particularly useful when said colloidal object are living cells, organelles or viruses, or assemblies of cells, organelles or viruses, said microchannel network comprises an inlet of a fluid comprising at least one component able to sustain or modify the metabolism of said colloidal objects.

In yet another preferred embodiment, the microchannel networks of the invention, or the device of the invention, comprises a detector able to screen a property of at least some of said colloidal objects.

It is also an object of the invention, to propose a method for screening cells for at least one property, comprising the step of encapsulating, sorting or encapsulating and sorting said cells using one of the embodiments of the invention recited above.

It is also an object of the invention, to propose method for screening a library of compound for a property, comprising the step of encapsulating, within a microchannel network, some colloidal objects using one of the embodiments of the invention recited above, and the step of introducing at least some of the compounds in said library into said microchannel network.

As an exemplary list of applications, in which the invention is particularly useful, said compounds comprise nucleic acids, modified nucleic acids, proteins, polypeptides, aptamers, antibodies, ligands, chemicals, or drug candidates.

It is also an object of the invention, to propose a method of providing a therapeutic compound to a patient comprising administering a pharmaceutically effective amount of a colloidal particle encapsulated or sorted using a method, a microchannel network or a device according to the invention, or to at least one of its preferred embodiments as recited above.

EXAMPLES

Example 1 specifications of a device implementing the invention and its microfabrication. The microchip consists in a PDMS molded slab sealed by plasma activation on a glass slide bearing a thin spin-coated PDMS layer. Before use, the constructed circuits are left at 65° C. at least 24 hours to ensure full recovery of the PDMS hydrophobicity. Rectangular channels with a uniform height of 30 µm are obtained. The flow rate of the cell-containing medium is controlled using a single syringe pump (Harvard Apparatus) equipped with a Hamilton 250 µL syringe. Oil flow rates are controlled using a double syringe pump (Harvard Apparatus) equipped with a 1 mL Exmire syringe (upper channel) and a 500 µL Exmire syringe (lower channel). The 500 µL syringe diameter is 1⁄2 that of the 1 mL one, and the flow rate in the upper channel $Q_O$ is thus twice the flow rate in the lower channel. Syringes are connected to the circuit using Tygon tubes (inner diameter 250 µm, outer diameter 760 µm, Fisher Bioblock). On the chip side, the Tygon tubing is threaded in the PDMS chip via holes drilled using a homemade pincher (sanded down syringe needle, resulting holes of about 700 µm) before plasma sealing. The resulting assembly can withstand high pressures (>1 bar) without glue.

Superior and inferior regions of FIG. 1 are respectively denoted as "upper" and "lower" in the text. Note however that these adjectives only refer to the figures view, and do not refer to any specific orientation in space of the real device, which can be in a horizontal, tilted or vertical position. Upper left: full geometry, "o" and "c" denote oil and cell suspension medium inlets, respectively. Upper right: zoom on the region of interest. Cells in their medium (center inlet, $W_c$=70 µm) are focused at $L_J$=150 µm by two asymmetric paraffin oil streams ($W_o$=150 µm) in the focusing orifice ($W_F$=40 µm, $L_F$=500 µm). The post-focusing region is symmetrically separated into two outlet channels ($W_S$=450 µm) after $L_S$=150 µm. Outlet channels are 2 cm long. Bottom: zoom on the focusing region providing the coordinates and symbols used in example 6

Example 2

Figure 3:
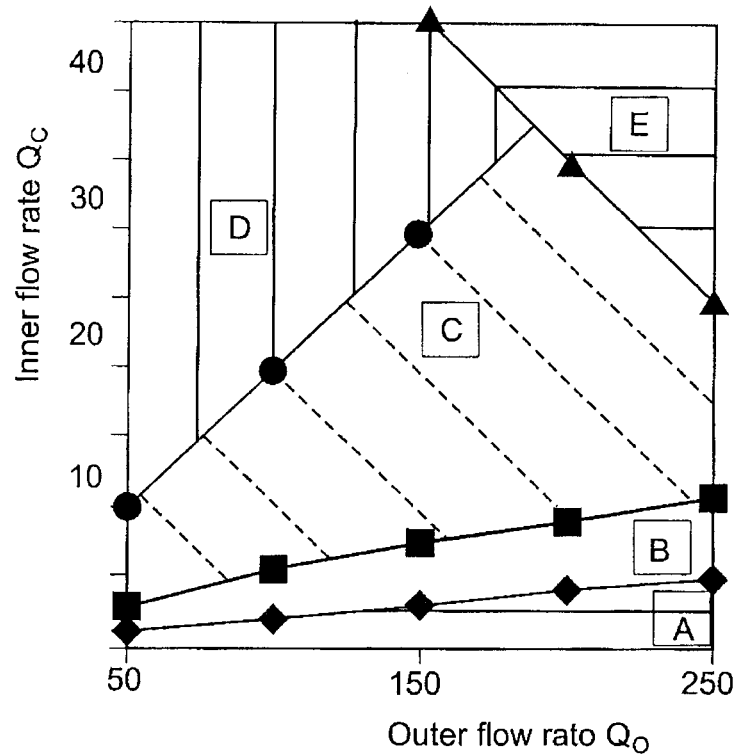
FIG. 3 represents the "phase diagram" of droplet formation in the device presented in FIG. 1, and the domains most suitable for the implementation of the invention.

Phase diagram of the behavior of flow streams in the device described in Example 1 (see also FIG. 3). An accurate evaluation of the average droplet size was obtained on high-speed video sequences by comparing the number of droplets generated in a given number of frames with the corresponding dispensed volume (for several hundreds of droplets). The size and polydispersity were also checked by direct image analysis.

Qualitatively, for $Q_O$<50 µL/h, the device functions in dripping mode and a jet is hardly formed (not depicted). In domain A, jetting is unstable, and not suitable for reproducible encapsulation. Above the (▲) line (domain E), the cell medium (center) stream is stable across the whole system, and clean encapsulation of individual cells is not possible. In the rest of the diagram, the jet breaks in the strait and each line is an "equidiameter" (corresponding to a constant drop diameter in the flow rates zone explored): (♦) $\Phi_N$=7 µm±10%; (■) $\Phi_N$=10 µm±10%; (●) $\Phi_N$=17 µm±10%. Domains B, C and D lead to monodisperse and stable droplet formation: monodisperse droplets are generated at rates >1000 s$^{-1}$ by jet break-up in the strait. These domains differ by the size of the droplets, and consequently by their fate in the outlet splitting. The line defined by full circles (●) corresponds to a nominal droplet diameter (in the absence of cells) comparable to the size of a cell. The line defined by squares (■) separates upper domains (C and D), in which the droplets formed after jet instability are dispatched in both outlet channels, from the lower domain (B), in which all droplets exit in the bottom channel. In regions B and C, the diameter $\Theta_N$ of the droplets generated by the spontaneous jet instability is smaller than or comparable to that of the cells, $\Theta_C$. Domain B is the interesting one for cell encapsulation (see examples 3, 4 and 5).

Example 3

Figure 4:
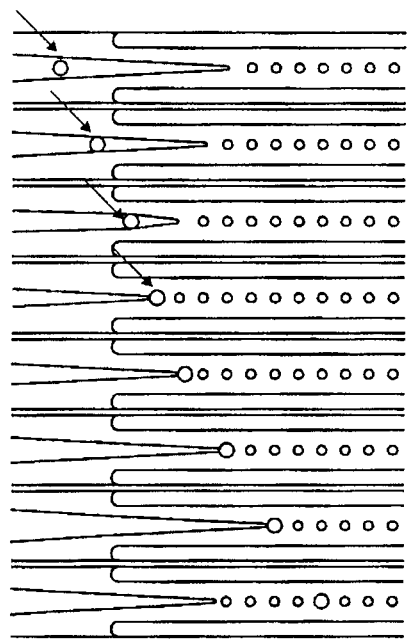
FIG. 4 represents image sequences exemplifying the encapsulation individual lymphocytes, in a device of the type presented in FIG. 1.

Encapsulation of cells in a device as described in Example 1 (see FIG. 4). In regions B and C of the phase diagram in FIG. 3, the diameter $\Theta_N$ of the droplets generated by the spontaneous jet instability is smaller than or comparable to that of the cells, $\Theta_C$. When a medium containing cells is used, the passage of a cell in the jet induces a rupture of the jetting "neck" (FIG. 4) upstream of the position where the jet breaks in the absence of cells and the cell gets encapsulated in a ("positive") drop with diameter $\Theta_P$ larger than that of empty ("negative") drops, $\Theta_N$. When cells arrive contiguously in the focusing region but are not adhering, the high elongational strain separates them and leads to encapsulation of single cells in individual drops. This is a further significant advantage of the invention as compared to prior art for cell encapsulation Example 4

Figure 5:
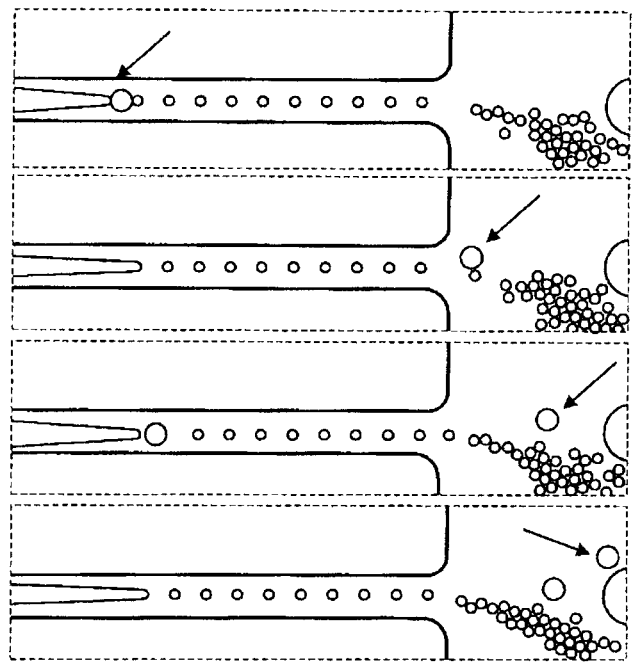
FIG. 5 represents the sorting of large and small droplets, in a device of the type presented in FIG. 1

Simultaneous encapsulation and sorting of cells in a device as described in example 1 (see FIG. 5). Assuming a laminar Poiseuille flow between two infinite vertical walls in the strait, mass conservation implies that the cell medium stream should be located at roughly ⅜ of the strait width starting from the lower wall. Indeed, as confirmed experimentally, droplets resulting from jet break-up are initially located at this coordinate within experimental accuracy (FIGS. 4 and 5). Due to the parabolic flow profile, and because of the small viscosity ratio between aqueous solution and mineral oil ($<10^{-2}$), droplets undergo a lateral shear-induced drift away from the walls and toward the center of the channel. The drift velocity is a strong function of the droplet diameter $\Theta$ (proportional to $\Theta^3$). Consequently, during the short time (a few tenths of milliseconds) they spend in the focusing region, big drops are driven towards the channel's center whereas smaller ones remain on a lower streamline (supporting online text). This effect initiates a self-sorting of positive droplets, which exit the strait with their center of mass on a streamline closer to the channel's center than empty droplets. We amplify the shear-driven sorting effect described in example 4 by a dispersion mechanism associated with steric interactions between droplets at the channel expansion: the flow velocity decreases abruptly and droplets collide due to thinning of the oil spacer initially separating them in the strait. These collisions induce a spreading of the droplets train in the transverse direction. The amplitude of this spreading depends on the expansion ratio of the microchannel and on the relative values of the oil and buffer flows $Q_o$ and $Q_c$, allowing those skilled in the art to tune optimally these parameters for each particular application. In region C of the diagram in FIG. 3, negative droplets reach both outlets. Conversely, in region B, they all exit by the bottom outlet, but spreading leads to a segregation of positive droplets: as negative drops enter the expansion from lower streamlines than positive ones, they push the latter up towards the top outlet. Quantitative results are provided in example 4. The flow combinations leading to the best yield in positive drops with minimal contamination by negative ones in the upper outlet lie along the boundary between domains B and C (FIG. 3). Decreasing $Q_c$ (i.e. entering deeper and deeper into domain B), a lower fraction of positive drops enters the upper outlet. As a possible interpretation of the ability of the invention to sort very efficiently large drops from smaller ones, we propose that when the droplet train is relatively dense (i.e. at high Qc), and the expansion is strong, there is a steric incompatibility between the compression ratio that would be imposed by linear hydrodynamics, and the maintenance of all droplets in a spherical shape along their initial streamline. The weaker surrounding medium yields, and droplets invade the surrounding streamlines, leading to the observed dispersion effect. Interestingly, because this steric effect is a direct neighbor-to-neighbor interaction, it tends to preserve and amplify the initial segregation of larger droplets towards the more central streamlines in the strait, which resulted from shear-driven drift. However, this explanation is there only to facilitate understanding and application and the invention, which exerts its benefits independently of the physical mechanisms at play, and of the validity of the above interpretation Example 5

Sorting of droplets of different sizes according to the invention (see FIGS. 4 and 5) exemplified by statistical results for cell sorting. Grey lines correspond to optimal encapsulation and sorting efficiencies. The flow combinations leading to the best yield in positive drops with minimal contamination by negative ones in the upper outlet lie along the boundary between domains B and C (FIG. 3). Decreasing $Q_c$ (i.e. entering deeper and deeper into domain B), a lower fraction of positive drops enters the upper outlet. As the size and volume fraction of negative droplets decrease, their effect on positive ones becomes insufficient to drive them in the top outlet. Using optimal flow conditions, for a cell concentration around $10^7$ cells/mL, 80±3% of the positive droplets are recovered in the upper outlet channel with less than 1% of negative drops and an encapsulation rate superior to 20 cells per second. A further increase in throughput could be expected by simultaneously increasing the oil and cell medium flow rates. However, at oil flow rates above 200 µL/h, the sorting efficiency decreases due to increased deformations of positive drops, which perturb droplet-droplets interactions.

| Oil flow rate (µL/h) | Cells flow rate (µL/h) | multiple cells per drop (% of the total cell number) | positive drops sorted (%) | Number of cells counted | Empty drops among positive drops (%) |
| --- | --- | --- | --- | --- | --- |
| 50 | 3 | 2.4% | 50.0% | 172 | <1% |
| 50 | 3.5 | 2.2% | 69.4% | 187 | <1% |
| 50 | 4 | 7.4% | 70.2% | 766 | 64.9% |
| 100 | 2 | 8.8% | 36.0% | 341 | <1% |
| 100 | 3 | 2.0% | 45.7% | 310 | <1% |
| 100 | 4 | 3.1% | 59.7% | 256 | <1% |
| 100 | 5 | 4.6% | 61.2% | 389 | <1% |
| 100 | 6 | 4.2% | 74.0% | 802 | 3.9% |
| 150 | 3 | 7.5% | 36.7% | 106 | <1% |
| 150 | 4 | 3.6% | 49.1% | 289 | <1% |
| 150 | 5 | 2.2% | 59.2% | 377 | <1% |
| 150 | 6 | 5.8% | 70.5% | 530 | <1% |
| 150 | 7 | 1.4% | 79.2% | 936 | <1% |
| 150 | 8 | 7.5% | 77.4% | 1311 | 5.7% |
| 200 | 6 | 4.2% | 16,0% | 379 | <1% |
| 200 | 7 | 5.4% | 29.4% | 286 | <1% |
| 200 | 8 | 4.9% | 38.8% | 444 | <1% |
| 200 | 9 | 7.4% | 51.5% | 607 | <1% |

Example 6

Calculations Methods Useful for Optimizing the Design of Devices According to the Invention To facilitate understanding, this examples will be developed using the parameters of the device described in FIG. 1. It will be clear, however, that the calculation method proposed here is very general, and indeed it is one of its purpose to facilitate the application of the invention to devices with a wide and diverse range of geometries Evaluation of the Jet Position:

FIG. 1 presents in detail the geometry of an exemplary embodiment.

The jet position, as measured by microscopy, lies at 15±0.5 µm from the "lower" wall of the channel. This closely corresponds to the value theoretically expected considering a Poiseuille flow in a microchannel with infinite extension in the direction perpendicular to the plane of the chip (15.5 µm~(3$W_F$/8)). Actually, our channel has a finite depth, but no analytical solution (other than Fourier series development) exists for a rectangular channel. Considering the good agreement between the experimental result and that obtained within the infinite slab approximation, we shall use the latter for further semi-quantitative evaluations.

Numerical Evaluation of Shear Induced Drift Velocity.

A simple numerical calculation for droplets shear-induced migration can help understanding the striking (and instrumental) positioning difference in the strait between positive and negative droplets. The behavior of deformable drops in a shear flow was described theoretically by Chan, P. C.-H., Leal, L. G., *J. Fluid Mech.* 92, 131-170 (1979), for a Poiseuille flow between two infinite walls and in a circular pipe. In homogeneous hydrodynamics at low Reynolds numbers, flow behaviors in complex geometries can be addressed with a good level of accuracy using finite elements numerical simulation software. Treating non-steady biphasic flows as those involving droplets formation and deformation, however, is much trickier due to time-dependent discontinuities at the liquid-liquid interfaces. Thus, we chose here to rather search for an analytical solution clearly showing the physical processes at play, at the expense of approximating the strait by a system with a simpler coordinate system. Namely, we chose to model our "strait" as a slit between two infinite walls separated by $W_F$=40 µm, since this approximation seems to provide a good prediction of the position of the aqueous flow stream (see above). The Poiseuille flow profile in the coordinate system of FIG. 3 is thus:

$$V(y) = 4V_M \frac{y}{W_F}\left(1 - \frac{y}{W_F}\right)$$

where $V_M$ is the maximum speed (at y=$W_F$/2) and $W_F$ is the width of the channel.

According to ref. 1, the drop migration velocity across the flow along y-axis is given by:

$$u_m = 16\alpha \frac{\eta_o}{\gamma} V_M^2 \frac{a^3}{W_F^3}\left[1 - 2\frac{y}{W_F}\right] \quad [1]$$

where $\eta_o$ is the oil viscosity, $\gamma$ is the interfacial tension between oil and aqueous solution, a is the drop radius, and $\alpha$~0.66 is a coefficient depending on the dispersed and continuous phase viscosity ratio. It should be noted here that a can be positive or negative depending on this viscosity ratio. In our case, the viscosity of the aqueous phase is two orders of magnitude smaller than that of the oil, so α is positive, and droplets migrate toward the center of the parabolic flow.

The drop flows along the x-axis in the Poiseuille flow at a speed U:

$$U = 4V_M \frac{y}{W_F}\left(1 - \frac{y}{W_F}\right) - \kappa V_M \frac{a^2}{W_F^2} \quad [2]$$

where κ~0.004 depends again on the dispersed and oil phase viscosity ratio but is always positive.

The trajectory is calculated using:

$$\int_{x_o}^{x} dx = \int_{y_o}^{y} \frac{U}{u_m} dy$$

which using [1] and [2] easily integrates to:

$$16\alpha \frac{\eta_o}{\gamma} V_M \frac{a^3}{W_F^4}[x - x_o] = \quad [3]$$

$$\frac{y^2 - y_o^2}{W_F^2} - \frac{y - y_o}{W_F} - \frac{1}{2}\left(1 - \kappa\frac{a^2}{W_F^2}\right)\ln\left(\frac{1 - 2\frac{y}{W_F}}{1 - 2\frac{y_o}{W_F}}\right)$$

These results correlate qualitatively well with our experimental observations.

To check for the robustness of our "infinite slit" approximation, we now consider another approximation amenable to analytical solution, i.e. modeling our channel by a cylindrical pipe with a 20 µm radius. Following the steps outlined above, Chan & Leal get for the droplets trajectories:

$$2\alpha_o \frac{\eta_o}{\gamma} V_M \frac{a^3}{R^4}[x - x_o] = \frac{y^2 - y_o^2}{2R^2} - \left(1 - \kappa\frac{a^2}{R^2}\right)\ln\left(\frac{y}{y_o}\right) \quad [4]$$

where $\alpha_o$~1.10 is again a coefficient depending on the dispersed and continuous phase viscosity ratio.

The results are close to those obtained in the 2D case. For the sake of comparison, droplets trajectories in a plane bisecting the microchannel, calculated using both approximations, are presented in FIG. 6 for various droplet radii. The curves show an identical qualitative behavior, suggesting that simplifying the channel's geometry as we did does not endanger our qualitative conclusions, and that the invention will operate in wide variety of channels regardless of their particual shape, rectangular, cylindrical or other. As an extra word of caution, it should be kept in mind that the theoretical model for droplet migrations also assumes that the droplet dimension is small as compared with the microchannel's size. In our experiments, the largest droplets can reach about ½ of the channel's dimension, so this model's predictions must be considered semi-quantitative for our largest droplets. Finally, this calculation assumes small drop deformations, i.e. a small capillary number. Our capillary number is typically smaller than 1, but it can reach 0.5 for the largest flow rates, so this approximation may also lead to a deviation from quantitative prediction. The effect of these last two approximations on the final position of the drops, however, is mild, because they asymptotically tend to align with the center of the channel, and we have seen that the strait is long enough to allow migration of our positive drops within 1 or 2 µm from the center of the channel. Thus, changing the drift velocity for these large droplets by a factor of 2 would indeed affect their final position by typically no more than 10%. Changing the velocity of negative droplets would affect their position more strongly, but both the capillary number and the size ratio are small for these smaller droplets, so that finite size effects and droplet deformation only affect weakly the predicted velocity.

In practice, the trajectories below show for both models a clear-cut distinction between the positioning of negative drops (with a typical radius in the range 3.5-5 µm), and positive ones (with a typical radius between 7.5-10 µm). The distance between the initial position of the droplets train and the channel's center plane is around 5 µm, so positive droplets are predicted to travel almost all the way to the center, whereas negative ones are expected from the model to travel no more than ½ of this distance. We experimentally measure a migration distance 1 µm±1 µm for negative drops and 4 µm±1 jam for positive ones. Our qualitative predictions are thus in good agreement with our observations, so we believe that the shear-driven drift mechanism described in ref 1 indeed captures the essential physical mechanism for the droplets positional sorting occurring in our strait. Moreover, equation [3] and [4] highlight the dependence of the droplet migration amplitude with the maximum speed of the oil in the channel, and therefore the oil flow rate. That might explain the improved efficiency of our system at high oil flow rates (i.e. 150 µL/h) as compared to lower ones (50 µL/h).

Example 7

Figure 7:
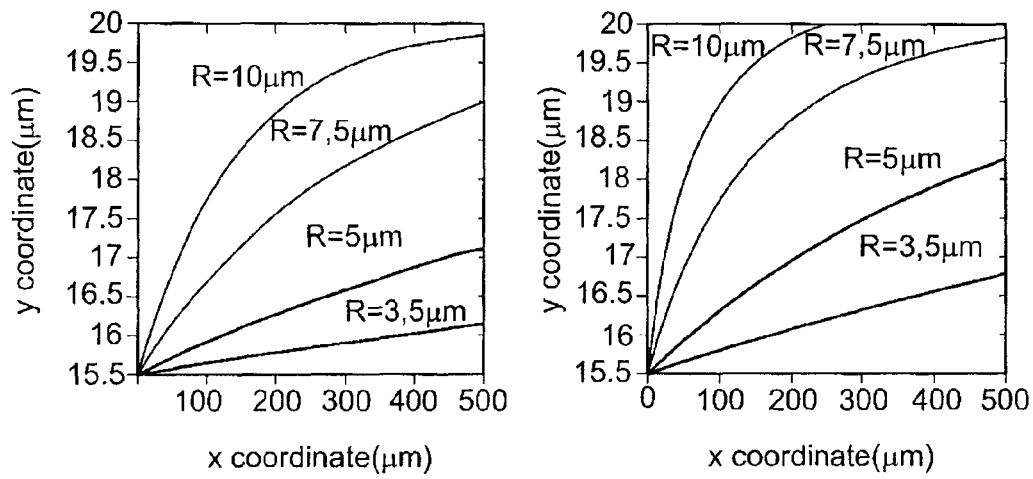
FIG. 7 represents examples of calculated trajectories of colloidals of different sizes across the narrow strait of a microchannel network according to the invention, showing the possibility to sort them by size using hydrodynamic drift.
Figure 8:
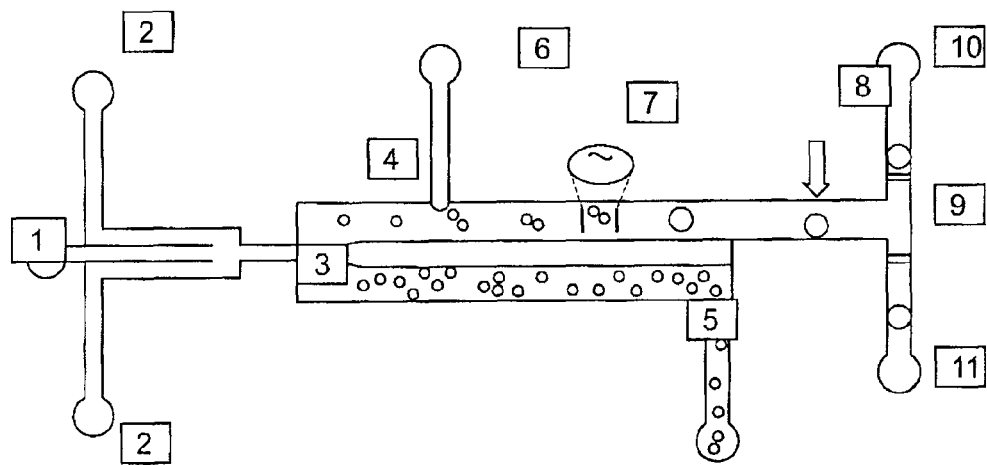
FIG. 8 represent exemplary possible implementations of the invention, for the screening of the properties of encapsulated objects with regards to particular reagents.

Simultaneous encapsulation, sorting and screening of cells according to the invention, with delivery of reagents after encapsulation and sorting. Example for high-throughput live-dead screening of cells according to the invention, with reference to FIG. 7. Cells injected by the inlet 1 are focused by two oil streams injected by 2 and sorted according to example 4 in the widening 4. Empty droplets are discarded by the trash outlet 5. Reagent droplets are generated in flow by live/dead cell dye inlet 6, as described e.g. in Brouzes et al., Proc. MicroTAS 2006, and coalesced with cell-containing droplets using an electrocoalescence system 7, as described e.g. in Chabert et al., Electrophoresis (2005). Electrophoresis, 26: 3706-3715, or Ahn et al., Appl. Phys. Lett. 88, 264105 (2006). Fluorescence is detected by a laser 8 and the two-way valve 9 orients the droplets toward outlets 10 and 11 depending on the cell being dead or alive. This downstream part of the process is already known of those skilled in the art, and it is recited e.g. in Brouzes et al., Proc. MicroTAS 2006, or in US, but it provides much higher throughput and more reliable results in combination with the present invention.

Example 8

Encapsulation and sorting of cells, followed by the PCR amplification of the cell's DNA content inside the formed and sorted capsules.

The operation is similar to this described in example 7, except that in this case "PCR mix" supplemented with fluorescent dye SybrGreen, sensitive to duplex DNA, is introduced by inlet 6, instead of live-dead label. Downstream of inlet 6, the upper channel is connected to a device for online PCR in droplets, as described e.g. in Dorfman et al., (2005). *Analytical Chemistry*, 77: 3700-4 and Chabert et al., Anal. Chem, Anal. Chem. 2006, 78, 7722-7728. "Comprising" is synonymous with "comprising at least one".

The invention claimed is:

1. A method for encapsulating and sorting colloidal objects, wherein
   the encapsulating comprises flowing said objects in a first flow stream partly or fully surrounded by at least one second flow stream in a narrow strait of a microchannel,
   along a path of said first flow stream in the strait either (a) the cross section of said first flow stream is smaller than the largest cross section of at least some of said objects, or (b) the smallest width of said first flow stream in a direction perpendicular to the flow direction is smaller than the largest width of at least some of said objects, such that said first flow stream is, in the absence of said objects, forming droplets with a volume smaller than the volume of at least some of said objects,
   said first flow stream is not symmetric with regard to the longitudinal axis of said microchannel in said narrow strait, and
   the sorting of the encapsulated objects occurs under passive hydrodynamics.

2. A method according to claim 1, wherein the cross section of said first flow stream is smaller than the smallest cross section of at least some of said objects.

3. A method as in claim 2, wherein the section of said first flow stream is smaller than the smallest section of at least some of said objects.

4. A method according to claim 1, wherein the smallest width of said first flow stream is smaller than the smallest width of at least some of said objects.

5. A method according to claim 1, wherein said first flow stream involves a first liquid, and said second flow stream or said second flow streams involve at least one second liquid, miscible with said first liquid.

6. A method according to claim 1, wherein said first flow stream involves a first liquid, and said second flow stream or said second flow streams involve at least one second liquid, immiscible with said first liquid.

7. A method according to claim 6, wherein said first flow stream splits into droplets in said channel.

8. A method according to claim 5, wherein said first liquid is a hardenable material.

9. A method according to claim 6, wherein said second liquid has a viscosity larger that the viscosity of said first fluid by a factor of at least two.

10. A method according to claim 1, wherein at least some of said colloidal objects are either cells, organelles, viruses, cell aggregates, islet cells, stem cells, embryos, pollen grains, artificial or natural organic particles, dendrimers, vesicles, magnetic particles, nanoparticles, quantum dots, metal microparticles, metal nanoparticles, organometallic micro or nanoparticles, nanotubes, artificial or natural macromolecules, microgels, macromolecular aggregates, proteins or protein aggregates, polynucleotides or polynucleotide aggregates, nucleoproteic aggregates, polysaccharides, or supramolecular assemblies.

11. A method for encapsulating colloidal objects, comprising flowing said objects in a first flow stream partly or fully surrounded by at least one second flow stream in a microchannel comprising a narrow strait, wherein along a path of said first flow stream in the strait either (a) the cross section of said first flow stream is smaller than the largest cross section of at least some of said objects, either (b) the smallest width of said first flow stream in a direction perpendicular to the flow direction is smaller than the largest width of at least some of said objects, either (c) said first flow stream is forming droplets, in the absence of said objects, with a volume smaller than the volume of at least some of said objects, or (d) said first flow stream would have in the absence of said objects, a shape that cannot entirely encompass some of said objects, the encapsulation resulting in objects encapsulated in droplets and in droplets of a smaller size not encapsulating objects, wherein said first flow stream containing the colloidal objects travels in said strait, at a position not centered with one or more flow lines of minimal shear stress.

12. A method for screening objects for a given property or activity, comprising encapsulating said objects by flowing them in a first flow stream partly or fully surrounded by a second flow stream in a channel with a variable section, wherein the section of said first flow stream in at least a part of said channel has a dimension smaller than a section of said objects, and sorting the encapsulated objects via passive hydrodynamics.

13. The method according to claim 12, wherein said channel comprises a strait, and wherein the first flow stream containing the colloidal objects travels in the strait, at a position not centered with one or more flow lines of minimal shear stress.

14. The method according to claim 11, the size of said droplets being correlated to the size of said objects contained in the compartments.

15. The method according to claim 1, wherein the first flow is sandwiched by two flows of the second fluid and the three flows converge into a central channel with a reduced section, forming said strait.

16. The method of claim 1, the first flow being of a discontinuous type, breaking into spontaneous droplets, the spontaneous droplets being smaller than droplets encapsulating the objects, or the passage of the objects in the strait causing the breaking of the first flow into droplets encapsulating the objects.

17. The method of claim 1, a volume of droplets encapsulating objects being larger by a factor of at least 1.8 than a volume of droplets not encapsulating objects.

18. A method for encapsulating and sorting colloidal objects, the encapsulating comprising flowing said objects in a first flow stream partly or fully surrounded by at least one second flow stream in a channel, splitting the first fluid into a multiplicity of compartments with different volumes suspended in the second fluid, wherein more than 50% of said compartments each contain only one of said colloidal objects, and wherein said sorting is achieved by passive hydrodynamics without modifying, based on a property of said objects, a trajectory of said objects using a DC or AC electrical field.

19. The method according to claim 1, wherein the encapsulation resulting in objects encapsulated in droplets and in droplets of a smaller size not encapsulating objects, a volume of droplets encapsulating objects being larger by a factor of at least 1.5 than a volume of droplets not encapsulating objects.

20. The method according to claim 1, wherein the encapsulation and sorting does not involve modifying a trajectory of the droplets using a DC or AC electrical field.

* * * * *